United States Patent
Lin et al.

(10) Patent No.: US 9,781,414 B2
(45) Date of Patent: *Oct. 3, 2017

(54) METHOD AND APPARATUS FOR DERIVATION OF SPATIAL MOTION VECTOR CANDIDATE AND MOTION VECTOR PREDICTION CANDIDATE

(71) Applicant: HFI Innovation Inc., Zhubei, Hsinchu County (TW)

(72) Inventors: Jian-Liang Lin, Yilan (TW); Yi-Wen Chen, Taichung (TW); Yu-Pao Tsai, Kaohsiung (TW); Yu-Wen Huang, Taipei (TW); Shaw-Min Lei, Zhubei (TW)

(73) Assignee: HFI Innovation Inc., Zhubei (TW)

( * ) Notice: Subject to any disclaimer, the term of this patent is extended or adjusted under 35 U.S.C. 154(b) by 744 days.

This patent is subject to a terminal disclaimer.

(21) Appl. No.: 14/256,971

(22) Filed: Apr. 20, 2014

(65) Prior Publication Data

US 2014/0226725 A1   Aug. 14, 2014

Related U.S. Application Data

(62) Division of application No. 13/177,808, filed on Jul. 7, 2011, now Pat. No. 8,755,437.

(Continued)

(51) Int. Cl.
*H04N 19/51* (2014.01)
*H04N 19/52* (2014.01)
*H04N 19/513* (2014.01)

(52) U.S. Cl.
CPC ..... *H04N 19/00684* (2013.01); *H04N 19/513* (2014.11); *H04N 19/52* (2014.11)

(58) Field of Classification Search
CPC ............. H04N 19/52; H04N 19/00684; H04N 19/513

(Continued)

(56) References Cited

U.S. PATENT DOCUMENTS

| | | | |
|---|---|---|---|
| 6,122,317 | A | 9/2000 | Hanami et al. |
| 8,139,634 | B2 | 3/2012 | Ding et al. |

(Continued)

FOREIGN PATENT DOCUMENTS

| | | |
|---|---|---|
| CN | 1444406 A | 9/2003 |
| CN | 1239022 | 1/2006 |

(Continued)

OTHER PUBLICATIONS

"Samsung's Response to the Call for Proposals on Video Compression Technology", McCann et al., Document JCTVC-A124, Joint Collaborative Team on Video Coding (JCT-VC) of ITU-T SG16 WP3 and ISO/IEC JTC1/SC29/WG1, 1st Meeting: Dresden, Germany, Apr. 15-23, 2010.

(Continued)

*Primary Examiner* — Zhihan Zhou
(74) *Attorney, Agent, or Firm* — Oblon, McClelland, Maier & Neustadt, L.L.P.

(57) ABSTRACT

An apparatus and method of deriving a motion vector predictor (MVP) for a current MV of a current block in Inter, Merge or Skip mode are disclosed based on motion vector (MV) attribute search. The system determines first MV attribute search comprising whether a given MV pointing to the target reference picture in the given reference list, or whether the given MV pointing to the target reference picture in other reference list, and determines second MV attribute search comprising whether the given MV pointing to other reference pictures in the given reference list, or whether the given MV pointing to the other reference (Continued)

pictures in the other reference list. The MVP for the current block is then determined from the neighboring blocks according to a search order.

21 Claims, 15 Drawing Sheets

Related U.S. Application Data

(60) Provisional application No. 61/453,666, filed on Mar. 17, 2011.

(58) Field of Classification Search
USPC ..................................................... 375/240.16
See application file for complete search history.

(56) References Cited

U.S. PATENT DOCUMENTS

| | | | |
|---|---|---|---|
| 2003/0202596 A1 | 10/2003 | Lainema et al. | |
| 2004/0258153 A1 | 12/2004 | Linzer | |
| 2005/0226334 A1 | 10/2005 | Han | |
| 2006/0245497 A1* | 11/2006 | Tourapis | H04N 19/56 375/240.16 |
| 2008/0013628 A1 | 1/2008 | Lu et al. | |
| 2008/0212676 A1 | 9/2008 | Liu et al. | |
| 2011/0293012 A1* | 12/2011 | Au | H04N 19/52 375/240.16 |
| 2012/0099652 A1 | 4/2012 | Woods et al. | |
| 2012/0177122 A1* | 7/2012 | Zhou | H04N 19/52 375/240.16 |
| 2012/0219064 A1* | 8/2012 | Zheng | H04N 19/105 375/240.16 |
| 2015/0304682 A1 | 10/2015 | Xu et al. | |

FOREIGN PATENT DOCUMENTS

| | | |
|---|---|---|
| CN | 1926868 | 3/2007 |
| CN | 101031088 | 9/2007 |
| CN | 101340578 | 1/2009 |
| CN | 101945276 | 1/2011 |
| EP | 2 252 062 | 11/2010 |
| WO | 03026315 A1 | 3/2003 |
| WO | 2007074543 A1 | 7/2007 |
| WO | 2008091117 A1 | 7/2008 |
| WO | 2009115901 A2 | 9/2009 |

OTHER PUBLICATIONS

Jian-Liang Lin, et al., "Improved Advanced Motion Vector Prediction", Joint Collaborative Team on Video Coding (JCT-VC) of ITU-T SG16 WP3 and ISO/IEC JTC1/SC29/WG11 4th Meeting: Daegu, KR, Jan. 20-28, 2011, Document: JCTVC-D125.

* cited by examiner ary application of U.S.
METHOD AND APPARATUS FOR DERIVATION OF SPATIAL MOTION VECTOR CANDIDATE AND MOTION VECTOR PREDICTION CANDIDATE

CROSS REFERENCE TO RELATED APPLICATIONS

The present invention is a divisional application of U.S. Non-Provisional application Ser. No. 13/177,808, filed on Jul. 7, 2011, which claims priority to U.S. Provisional Patent Application No. 61/453,666, filed Mar. 17, 2011, entitled "The Derivation of Spatial MV/MVP Candidate for Inter, Skip and Merging Prediction Units in Video Compression". The U.S. Provisional Patent Application is hereby incorporated by reference in its entirety.

FIELD OF THE INVENTION

The present invention relates to video coding. In particular, the present invention relates to coding techniques associated with derivation of motion vector candidate and motion vector prediction candidate.

BACKGROUND

In video coding systems, spatial and temporal redundancy is exploited using spatial and temporal prediction to reduce the information to be transmitted. The spatial and temporal prediction utilizes decoded pixels from the same picture and reference pictures respectively to form prediction for current pixels to be coded. In a conventional coding system, side information associated with spatial and temporal prediction may have to be transmitted, which will take up some bandwidth of the compressed video data. The transmission of motion vectors for temporal prediction may require a noticeable portion of the compressed video data, particularly in low-bitrate applications. To further reduce the bitrate associated with motion vectors, a technique called Motion Vector Prediction (MVP) has been used in the field of video coding in recent years. The MVP technique exploits the statistic redundancy among neighboring motion vectors spatially and temporally. In the rest of this document, MVP may sometimes denote "motion vector prediction" and sometimes denote "motion vector predictor" according to contexts.

In High-Efficiency Video Coding (HEVC) development, a technique named Advanced Motion Vector Prediction (AMVP) is currently being considered by the standard body. The AMVP technique uses explicit predictor signaling to indicate the MVP selected from a MVP candidate set. In HEVC test model version 2.0 (HM-2.0), the MVP candidate set of AMVP includes spatial MVPs as well as a temporal MVP, where the spatial MVPs include two MVPs selected from two respective neighboring groups of the current block. The spatial MVPs proposed for the AMVP only consider the motion vectors (MVs) pointing to the target reference picture in the given reference list as the current block for spatial MVP derivation. If the MV pointing to the target reference picture in the given reference list is not available from the neighboring blocks, the MVP is not available. It is desirable to develop an MVP derivation scheme that can improve the availability of the MVP from the neighboring blocks. The improved MVP derivation scheme may result in smaller motion vector residues and, consequently, better coding efficiency. Furthermore, it is desirable that the MVP derivation scheme will allow the MVP candidate to be derived at the decoder based on decoded information so that no additional side information has to be transmitted.

BRIEF SUMMARY OF THE INVENTION

An apparatus and method of deriving a first motion vector predictor (MVP) and a second MVP for a current MV of a current block in Inter, Merge or Skip mode, wherein the current MV is associated with the current block and a corresponding block of a target reference picture in a given reference list, are disclosed. In one embodiment according to the present invention, the apparatus and the method comprise: receiving first motion vectors (MVs) associated with a first neighboring block group of the current block; determining first MV attribute search comprising whether a given MV pointing to the target reference picture in the given reference list, or whether the given MV pointing to the target reference picture in other reference list, and determining second MV attribute search comprising whether the given MV pointing to other reference pictures in the given reference list, or whether the given MV pointing to the other reference pictures in the other reference list; determining the MVP for the current block from the neighboring blocks according to a search order, wherein first effective MV is selected as the MVP, and wherein the search order comprises searching the MVs for the first effective MV having asserted first MV attribute search firstly; and searching the MVs for the first effective MV having asserted second MV attribute search firstly when no MV has the asserted first MV attribute search; and providing the MVP for the current block.

The neighboring blocks may comprise blocks on top side, upper-left corner and upper-right corner of the current block in the Inter or Skip mode, and wherein the search order for the blocks is from right to left. The neighboring blocks may also comprise blocks on left side and lower-left corner of the current block in the Inter or Merge or Skip mode, and wherein the search order for the blocks is from bottom to top. In another embodiment, the neighboring blocks comprise a leftmost block on top side and an upper-right corner block of the current block in the Inter or Merge or Skip mode, and wherein the search order for the blocks is from the upper-right corner block to the leftmost block on the top side. In yet another embodiment, the neighboring blocks comprise a top block on left side and a lower-left corner block of the current block in the Inter or Merge or Skip mode, and wherein the search order for the blocks is from the lower-left corner block to the top block on the left side. If the MVP is associated with a MV pointing to the other reference pictures in the given reference list or the other reference list, the MVP is scaled before the MVP is provided. In this case, the MVP is scaled according to picture-order-count (POC) distance associated with the MVP and the POC distance between a current picture and the target reference picture. The first MV attribute search associated with each of the neighboring blocks may contain two first MV attribute search elements, said two first MV attribute search elements are configured as a local search set having a local search order, wherein the search order comprises searching from one local search set for a neighboring block to next local search set for another neighboring block. The second MV attribute search associated with each of the neighboring blocks may contain two second MV attribute search elements, said two second MV attribute search elements are configured as a local search set having a local search order, wherein the search order comprises searching from one local search set for a neighboring block to next local search set for another neighboring block. The picture index for the target reference picture can be implicitly derived or explicitly signaled for the current block in the Merge mode, Skip mode, or Inter mode.

DETAILED DESCRIPTION OF THE INVENTION

Figure 1:
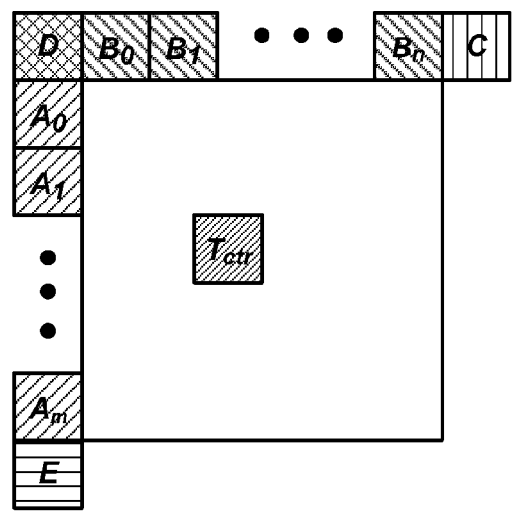
FIG. 1 illustrates neighboring block configuration for deriving spatial motion vector prediction candidate set for Inter and Skip modes according to High Efficient Video Coding.

In video coding systems, the spatial and temporal redundancy is exploited using spatial and temporal prediction to reduce the bitrate to be transmitted or stored. The spatial prediction utilizes decoded pixels from the same picture to form prediction for current pixels to be coded. The spatial prediction is often operated on a block by block basis, such as the 16×16 or 4×4 block for luminance signal in H.264/AVC Intra coding. In video sequences, neighboring pictures often bear great similarities, and simply using picture differences can effectively reduce the transmitted information associated with static background areas. Nevertheless, moving objects in the video sequence may result in substantial residues and will require higher bitrate to code the residues. Consequently, Motion Compensated Prediction (MCP) is often used to exploit temporal correlation in video sequences.

Motion compensated prediction can be used in a forward prediction fashion, where a current picture block is predicted using a decoded picture or pictures that are prior to the current picture in the display order. In addition to forward prediction, backward prediction can also be used to improve the performance of motion compensated prediction. The backward prediction utilizes a decoded picture or pictures after the current picture in the display order. Since the first version of H.264/AVC was finalized in 2003, forward prediction and backward prediction have been extended to list 0 prediction and list 1 prediction, respectively, where both list 0 and list 1 can contain multiple reference pictures prior to or/and later than the current picture in the display order. The following describes the default reference picture list configuration. For list 0, reference pictures prior to the current picture have lower reference picture indices than those later than the current picture. For list 1, reference pictures later than the current picture have lower reference picture indices than those prior to the current picture. For both list 0 and list 1, after applying the previous rules, the temporal distance is considered as follows: a reference picture closer to the current picture has a lower reference picture index. To illustrate the list 0 and list 1 reference picture configuration, the following example is provided where the current picture is picture 5 and pictures 0, 2, 4, 6, and 8 are reference pictures, where the numbers denote the display order. The list 0 reference pictures with ascending reference picture indices and starting with index equal to zero are 4, 2, 0, 6, and 8. The list 1 reference pictures with ascending reference picture indices and starting with index equal to zero are 6, 8, 4, 2, and 0. The first reference picture having index 0 is called co-located picture, and in this example with picture 5 as the current picture, picture 6 is the list 1 co-located picture, and picture 4 is the list 0 co-located picture. When a block in a list 0 or list 1 co-located picture has the same block location as the current block in the current picture, it is called a list 0 or list 1 co-located block, or called a co-located block in list 0 or list 1. The unit used for motion estimation mode in earlier video standards such as MPEG-1, MPEG-2 and MPEG-4 is primarily based on macroblock. For H.264/AVC, the 16×16 macroblock can be segmented into 16×16, 16×8, 8×16 and 8×8 blocks for motion estimation. Furthermore, the 8×8 block can be segmented into 8×8, 8×4, 4×8 and 4×4 blocks for motion estimation. For the High-Efficiency Video Coding (HEVC) standard under development, the unit for motion estimation/compensation mode is called Prediction Unit (PU), where the PU is hierarchically partitioned from a maximum block size. The MCP type is selected for each slice in the H.264/AVC standard. A slice that the motion compensated prediction is restricted to the list 0 prediction is called a P-slice. For a B-slice, the motion compensated prediction also includes the list 1 prediction in addition to the list 0 prediction.

In video coding systems, motion vectors (MVs) and coded residues are transmitted to a decoder for reconstructing the video at the decoder side. Furthermore, in a system with flexible reference picture structure, the information associated with the selected reference pictures may also have to be transmitted. The transmission of motion vectors may require a noticeable portion of the overall bandwidth, particularly in low-bitrate applications or in systems where motion vectors are associated with smaller blocks or higher motion accuracy. To further reduce the bitrate associated with motion vector, a technique called Motion Vector Prediction (MVP) has been used in the field of video coding in recent years. In this disclosure, MVP may also refer to Motion Vector Predictor and the abbreviation is used when there is no ambiguity. The MVP technique exploits the statistic redundancy among neighboring motion vectors spatially and temporally. When MVP is used, a predictor for the current motion vector is chosen and the motion vector residue, i.e., the difference between the motion vector and the predictor, is transmitted. The motion vector residue is usually termed motion vector difference (MVD) as well. The MVP scheme can be applied in a closed-loop arrangement where the predictor is derived at the decoder based on decoded information and no additional side information has to be transmitted. Alternatively, side information can be transmitted explicitly in the bitstream to inform the decoder regarding the motion vector predictor selected.

In the H.264/AVC standard, four different types of inter-prediction are supported for B slices including list 0, list 1, bi-predictive, and DIRECT prediction, where list 0 and list 1 refer to prediction using reference picture group 0 and group 1 respectively. When only reference pictures from one reference list (i.e., list 0 or list 1) is used, the prediction is referred to as uni-prediction mode. For the bi-predictive mode, the prediction signal is formed by a weighted average of motion-compensated list 0 and list 1 prediction signals. The DIRECT prediction mode is inferred from previously transmitted syntax elements and can be either list 0 or list 1 prediction or bi-predictive. Therefore, there is no need to transmit information for motion vector in the DIRECT mode. In the case that no quantized error signal is transmitted, the DIRECT macroblock mode is referred to as B SKIP mode and the block can be efficiently coded. Again, a good MVP scheme may result in more zero motion vector residues or smaller prediction errors. Consequently, a good MVP scheme may increase the number of DIRECT-coded blocks and improve the coding efficiency.

In HEVC being developed, some improvements of motion vector prediction over the H.264/AVC are being considered. For Inter and Skip modes in HEVC test model version 2.0 (HM-2.0), multiple spatial MVPs are joined with a temporal MVP for selecting a final MVP for the current block. For Merge mode in HM-2.0, multiple spatial MVPs are also joined with a temporal MVP for selecting a final MVP for the current block. In Merge and Skip modes, the final MVPs are the final MVs because their MVDs are zero by definition. In HM-2.0, the Inter and Skip modes utilize an Advanced Motion Vector Prediction (AMVP) algorithm to select one final motion vector predictor (MVP) within a candidate set of MVPs. The AMVP is proposed by McCann et al., entitled "Samsung's Response to the Call for Proposals on Video Compression Technology", Document JCTVC-A124, Joint Collaborative Team on Video Coding (JCT-VC) of ITU-T SG16 WP3 and ISO/IEC JTC1/SC29/WG1, 1st Meeting: Dresden, Germany, 15-23 Apr., 2010. The index of the selected MVP is transmitted. In the Skip mode of HM-2.0, the reference index will always be set to 0. In the Inter mode, the reference index is explicitly transmitted to the decoder.

FIG. 1 illustrates the candidate set of MVPs used in HM-2.0, which includes two spatial MVPs and one temporal MVP:

1. Left predictor (the first MV available from E, $A_m$, ..., $A_0$),
2. Top predictor (the first available MV from C, $B_n$, ..., $B_0$, D), and
3. Temporal predictor $T_{ctr}$ (a temporal MV, found by mapping the center of the block to its co-located block).

Figure 2:
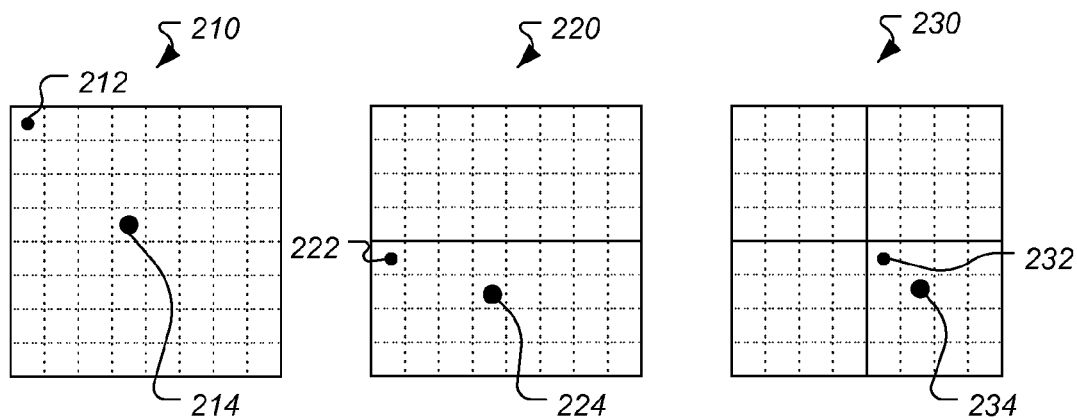
FIG. 2 illustrates an example of temporal predictor by mapping the center of the block to a co-located block instead of the origin of the block.

One MVP index is signaled to indicate which MVP from the candidate set is used. For the left predictor, the MVP is selected as the first available MV from the bottom block to top block which has the same reference picture index as the given reference picture index (it is set to 0 for Skip mode and is explicitly transmitted to the decoder for the Inter mode) and the same reference list as the given reference list. For the top predictor, it is selected as the first available MV which is not identical to the left predictor from the right block to the left block, which has the same reference picture index as the given reference picture index and the same reference picture list as the given reference list. The temporal predictor is determined by mapping the center of the block to a co-located picture, instead of the origin of the block. The location of the center for 3 types of partitioning of a 32×32 CU, i.e., 2N×2N 210, 2N×N 220 and N×N 230, is shown in FIG. 2. The centers and origins of the blocks are indicated by reference numbers 214, 212, 224, 222, 234, and 232 respectively.

Figure 3:
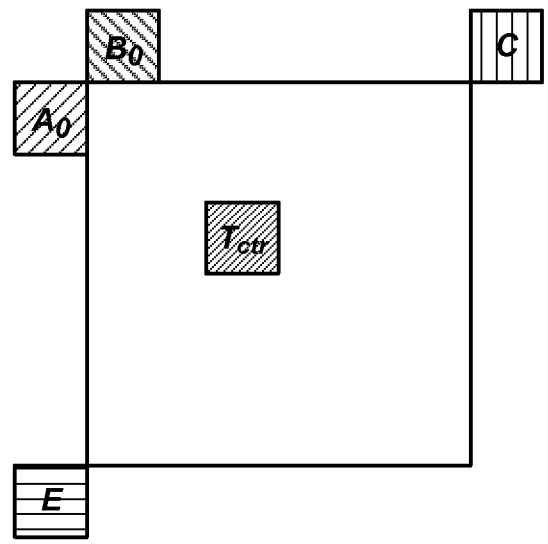
FIG. 3 illustrates neighboring block configuration for deriving spatial motion vector prediction candidate set for Merge mode according to HM-2.0.

In HM-2.0, if a block is encoded as a Merge mode, one MVP index is signaled to indicate which MVP from the candidate set is used for this block to be merged. FIG. 3 illustrates the neighboring block configuration for deriving the MVP for Merge mode. The candidate set includes four spatial MVPs and one temporal MVP:

1. Left predictor ($A_0$),
2. Top predictor ($B_0$),
3. Temporal predictor $T_{ctr}$ (a temporal motion vector, found by mapping the center of the block to a co-located picture),
4. Right-Top predictor (C), and
5. Left-Bottom predictor (E).

Figure 4:
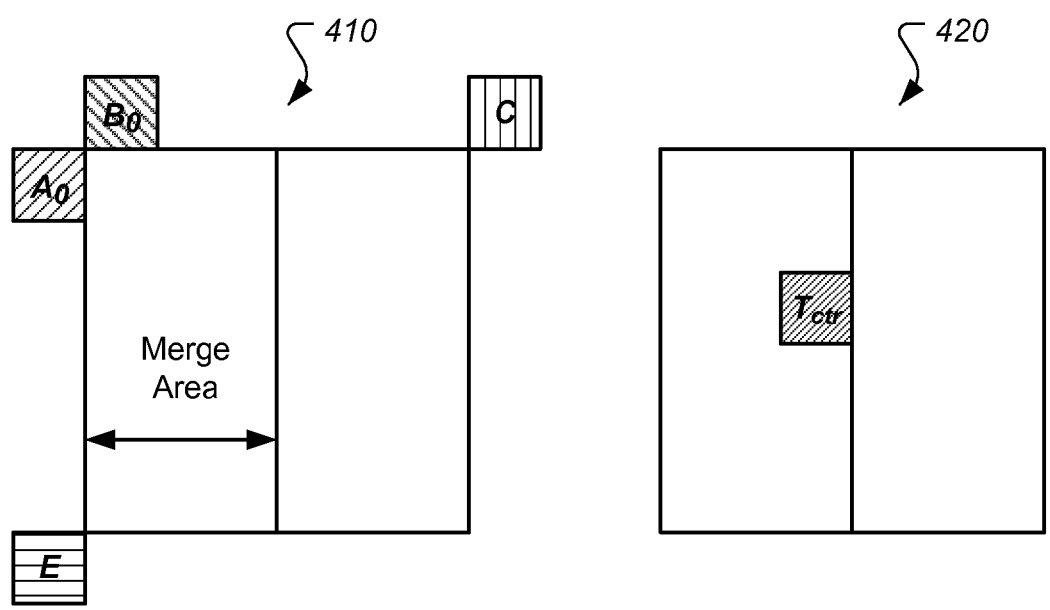
FIG. 4 illustrates neighboring block configuration for deriving spatial motion vector prediction candidate set for Merge mode for a first PU of an N×2N CU according to HM-2.0.
Figure 5:
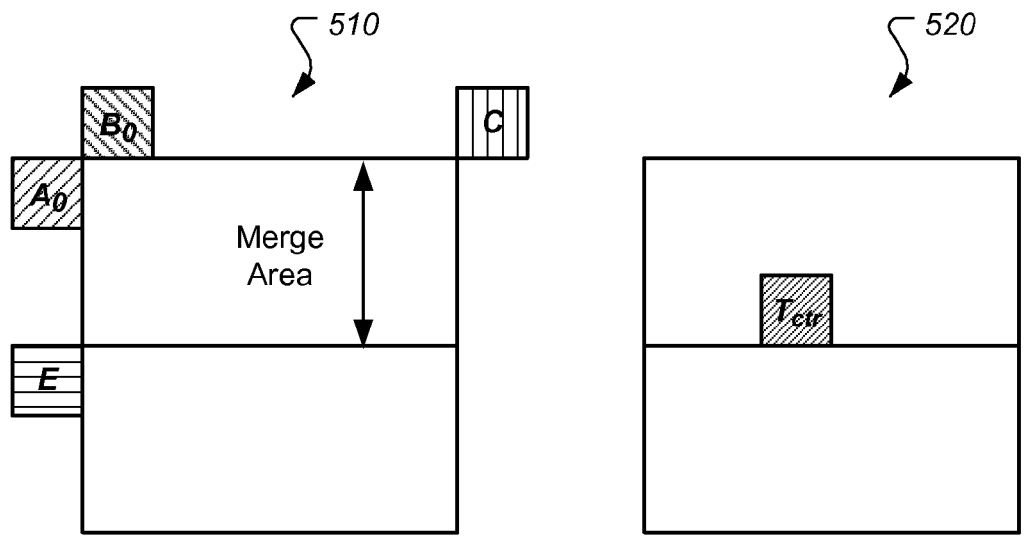
FIG. 5 illustrates neighboring block configuration for deriving spatial motion vector prediction candidate set for Merge mode for a first PU of a 2N×N CU according to HM-2.0.

For the spatial MVPs in Merge mode, the reference picture index will be set to the same as the reference picture index from the selected block. For example, if block C is selected according to the MVP index, the MV and the reference picture index from the block C are used for merge, i.e. the MV and reference picture index from block C are used for current PU. If the block has two MVs, the two MVs and their reference picture indices are used for bi-prediction. In particular, each CU can be merged as a whole (i.e. 2N×2N merge) or partially merged. If partition type N×2N or 2N×N is selected for Inter predicted CU, the first partition (i.e. PU) of this CU is forced to Merge mode. That is, the first PU of an N×2N or 2N×N CU will not have its own motion vector; instead, it has to share one of its neighboring blocks' motion vectors. At the meantime, the second PU of the N×2N or 2N×N CU can be either in Merge mode or Inter mode. The MVPs for partial merge of the first N×2N PU are shown in FIG. 4, where the spatial MVPs are indicated by reference number 410 and the temporal MVP is indicated by reference number 420. The MVPs for partial merge of the first 2N×N PU are shown in FIG. 5, where the spatial MVPs are indicated by reference number 510 and the temporal MVP is indicated by reference number 520.

Figure 6:
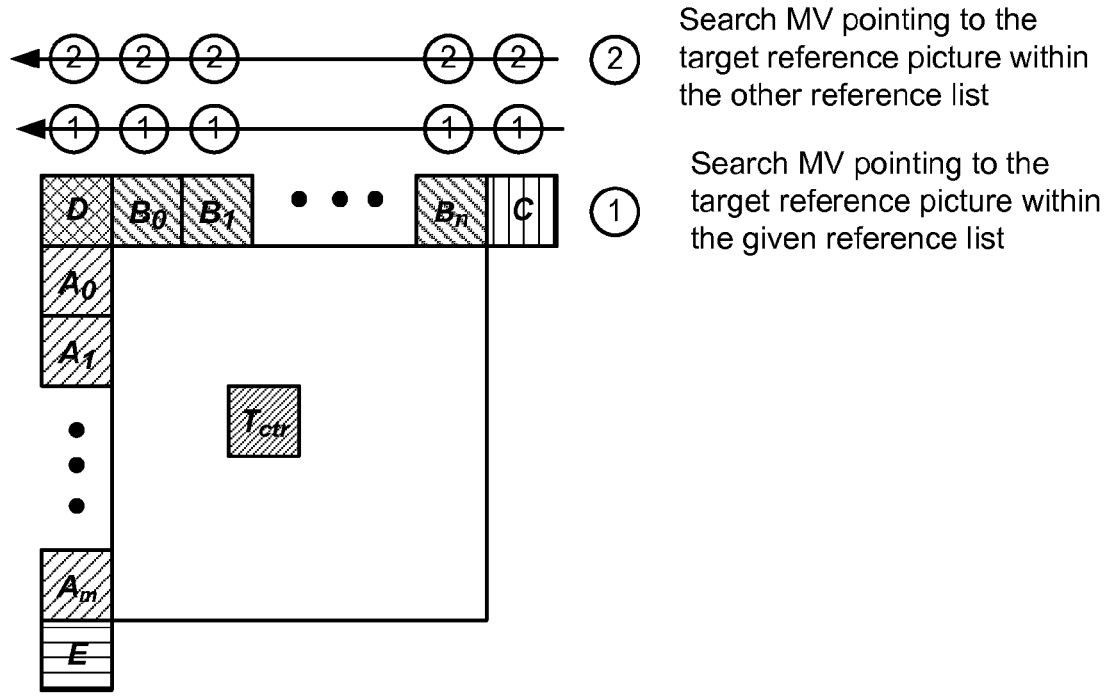
FIG. 6 illustrates an example of search scheme (S1) for a spatial MVP for Inter or Skip mode according to one embodiment of the present invention.

As mentioned before, AMVP is an effective means for reducing the information associated with transmission of an underlying motion vector. The efficiency of AMVP depends on the availability of MVPs and the quality of the MVPs (i.e., accuracy of the MVP). When an MVP is not available, the underlying MV has to be transmitted without prediction or with a prediction value 0. It is desirable to improve the MVP availability and quality. Accordingly, extended search scheme according to various embodiments of the present invention is disclosed. According to one embodiment of the present invention, the spatial MVPs for a target reference picture indicated by the given reference picture index of the given reference list can be derived from MVs pointing to the target reference picture either from the given reference list or the other reference list. For example, for the top predictor, if none of the neighboring blocks (from right to left) has the MV pointing to the target reference picture in the given reference list, the MVP candidate can be derived from the first available MV, in a search order from right to left, pointing to the target reference picture in the other reference list from the neighboring blocks (designated as search scheme S1). As shown in FIG. 6, it first searches for an available MV pointing to the target reference picture within the given reference list (marked as number 1). If none of the MVs pointing to the target reference picture within the given reference list is available, it then searches for an available MV pointing to the target reference picture within the other reference list (marked as number 2). Consequently, the search method as shown in FIG. 6 increases the possibility of finding a MVP than the conventional method. Similarly, an MVP can be derived for the left predictor by searching for an available MV pointing to the target reference picture either from the given reference list (searched first) or the other reference list (searched second).

Accordingly, a first MVP may be selected from a first group of neighboring blocks (neighboring blocks on the left in this example) and a second MVP may be selected from a second group of neighboring blocks (neighboring blocks on the top in this example). The first MVP and the second MVP are spatial MVPs and they can be joined with an optional temporal MVP to select a final MVP for the underlying block. There may be cases where only one spatial MVP is considered and the spatial MVP is equivalent to the final MVP. The apparatus and method disclosed herein for derivation of each MVP in the candidate set is also applicable to derivation of MVP when there is only one MVP. While the first group comprises neighboring blocks on the top of the current block and the second group comprises neighboring blocks on the left of the current block, the two groups may be configured differently. For example, block D may be assigned to the second group, i.e., the left predictor. The first group and the second group may comprise more neighboring blocks or fewer neighboring blocks than those shown in FIG. 6. While FIG. 6 through FIG. 9 illustrate examples of MVP derivation based on neighboring blocks on the top, similar apparatus and method can be applied to determine an MVP based on neighboring blocks on the left.

Figure 7:
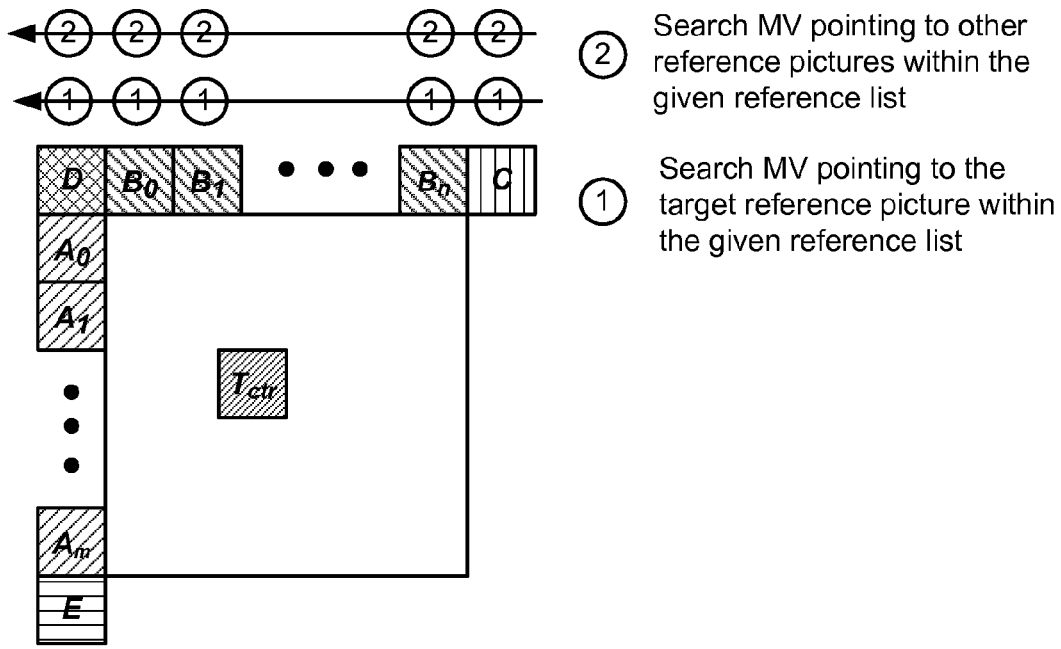
FIG. 7 illustrates an example of search scheme (S2) for a spatial MVP for Inter or Skip mode according to one embodiment of the present invention.
Figure 8:
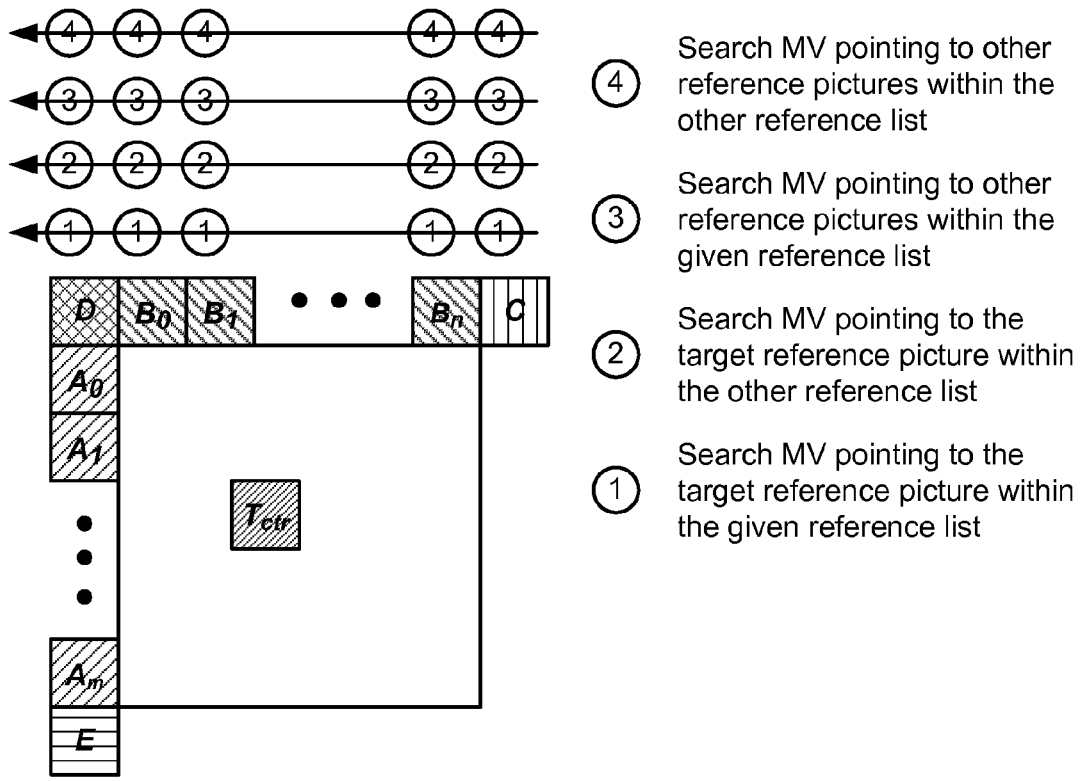
FIG. 8 illustrates an example of search scheme (S3) for a spatial MVP for Inter or Skip mode according to one embodiment of the present invention.
Figure 9:
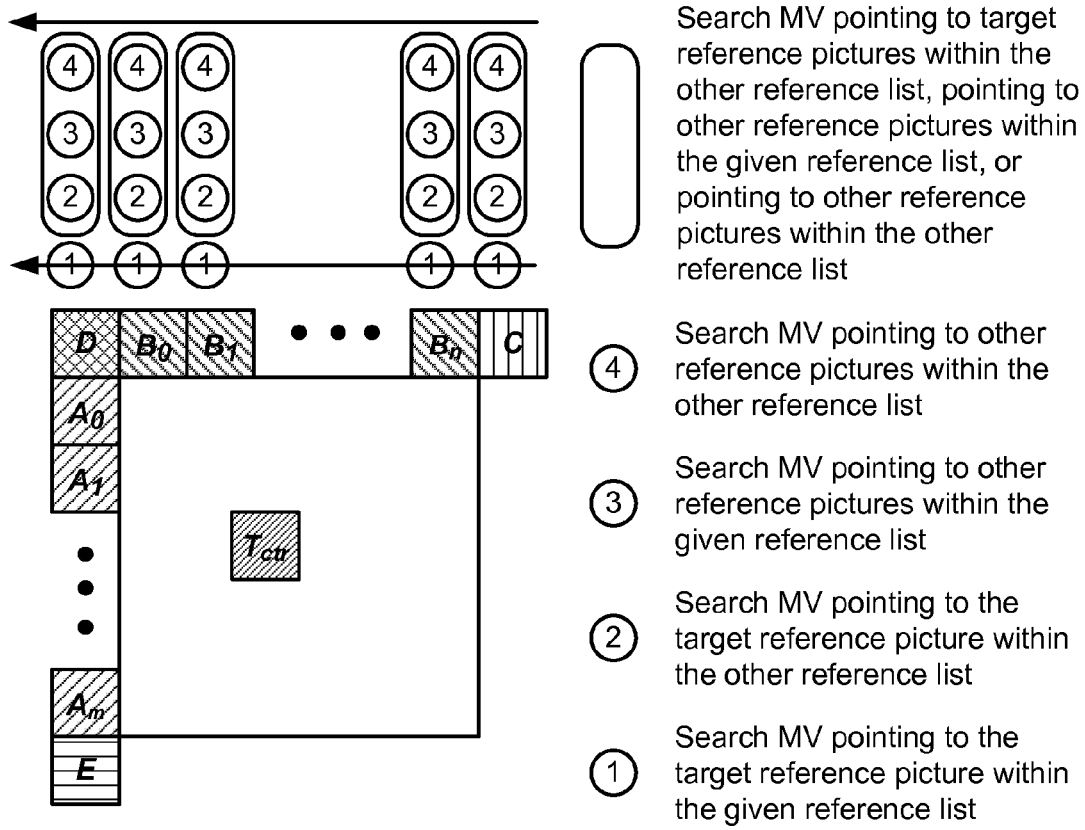
FIG. 9 illustrates an example of search scheme (S4) for a spatial MVP for Inter or Skip mode according to one embodiment of the present invention.

According to one embodiment of the present invention as shown in FIG. 6, the MVP derivation searches through a search set according to a search order. The search set consists of search elements (also named search MVs in this disclosure, or MVs for short in case of no ambiguity) pointing to the target reference picture in the given reference list (marked as number 1) and search MVs pointing to the target reference picture in the other reference list (marked as number 2). The search order starts with the search MVs marked as number 1 from right to left and then goes through the search MVs marked as number 2 from right to left. The first available motion vectors of the neighboring blocks that is found to be in the search set according to the search order is selected as the MVP. FIG. 7 through FIG. 9 correspond to various embodiments of the present invention having different search sets and/or different search orders.

In the search scheme S1 as shown in FIG. 6, the MVP can be derived from the first available MV pointing to the target reference picture in the other reference list from the neighboring blocks if none of the MVs associated with the target reference picture within the given reference list is available. When none of the MVs associated with the target reference picture within the given reference list is available and is not identical to the left predictor, the search scheme may also search the MVs pointing to other reference pictures within the given reference list (designated as search scheme S2). For example, for the top predictor, it first searches for an available MV within the given reference list from right to left (marked as number 1) as shown in FIG. 7. If none of the MVs is available and is not identical to the left predictor, it searches for the first available MV among the MVs pointing to other reference pictures within the given reference list (marked as number 2) as shown in FIG. 7. Consequently, the search method as shown in FIG. 7 increases the possibility of finding an MVP than the conventional method. When the MV selected as an MVP is among the MVs pointing to other reference pictures, the selected MV will be properly scaled according to the temporal distances. One example of temporal scaling is described in "Direct Mode Coding for Bipredictive Slices in the H.264 Standard", authored by Tourapis et al., in IEEE Trans. on Circuits and Systems for Video Technology, Vol. 15, No. 1, pp. 119-126, January 2005. The MVP will be scaled according to picture-order-count (POC) distance associated with the MVP and the POC distance between a current picture and the target reference picture.

The spatial MVP can also be derived from the MVs pointing to other reference pictures in the given reference list or the other reference list, or the target reference picture within the other reference list based on a selected searching order. FIGS. 8 and 9 illustrate two examples of the searching schemes corresponding to two search orders. According to one embodiment of the present invention, the search order for the MVP is 1) the MVs (from right to left) pointing to the target reference picture within the given reference list, 2) the MVs (from right to left) pointing to the target reference picture within the other reference list, 3) the MVs (from right to left) pointing to other reference pictures within the given reference list, and 4) the MVs(from right to left) pointing to other reference pictures within the other reference list, as shown in FIG. 8 (designated as search scheme S3). According to another embodiment of the present invention, the search order for the MVP candidate is 1) the MVs pointing (from right to left) to the target reference picture within the given reference list, and 2) the local search sets (from right to left), where each local search set consists of three MVs with local search order from the first MV pointing to other reference pictures within the given reference list, to the second MV pointing to the target reference picture within the other reference list, and to the third MVs pointing to other reference pictures within the other reference list, as shown in FIG. 9 (designated as search scheme S4). The search order starts with search MVs marked as number 1 from right to left and then goes through local search sets as marked by rounded rectangles from right to left as shown in FIG. 9. Again, when the MV selected as an MVP is from the MVs pointing to other reference pictures, the selected MV will be properly scaled according to temporal distances.

For the spatial MVP derivation, the reference picture index can be implicitly derived. For example, the reference picture index can be set to the median/mean of the reference picture indices from the neighboring blocks or the majority of reference picture indices from the neighboring blocks.

For the spatial MVP for Merge mode, the reference picture index can also be implicitly derived according to the median/mean or the majority of the reference picture indices from the neighboring blocks. Alternatively, for the spatial MVP for Merge mode, the reference picture index can also be explicitly signaled. For example, a syntax element may be used to indicate the reference picture index. For the spatial MVP for Merge mode, the prediction direction can also be signaled explicitly.

Figure 10:
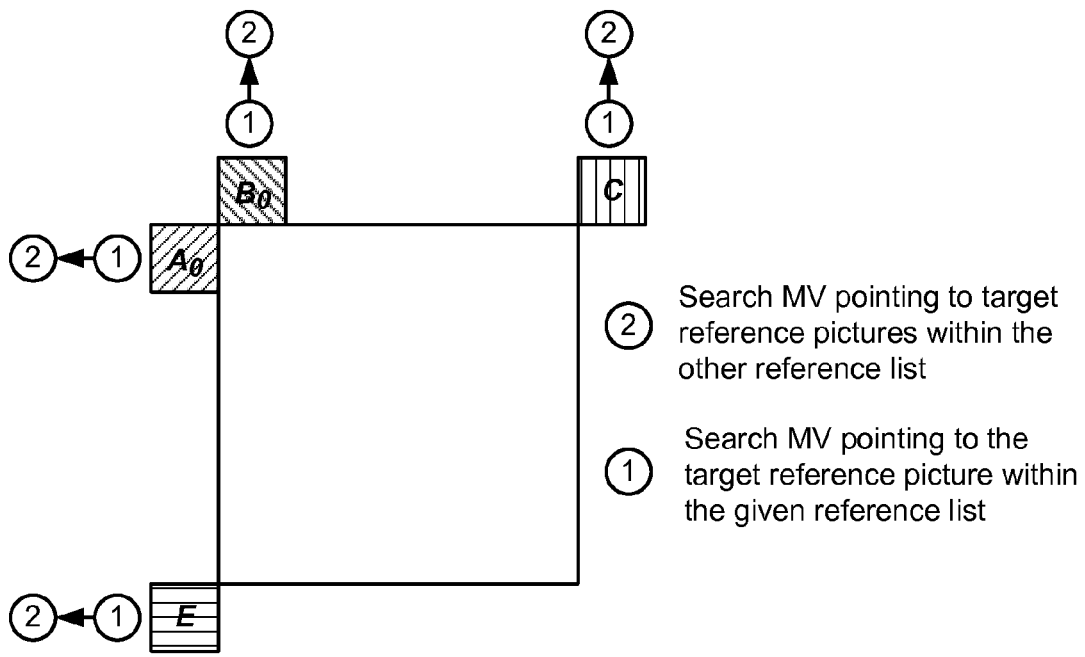
FIG. 10 illustrates an example of search scheme (S5) for a spatial MVP for Merge mode according to one embodiment of the present invention.

For the spatial MVP for Merge mode, when the target reference picture is given based on the given reference picture index and the given reference list, the spatial MVPs can be derived either from the given reference list or the other reference list. FIG. 10 illustrates an example of the MVP selection for Merge mode, where the search scheme searches the first available MV pointing to the target reference picture within the given reference list (marked as number 1). If none of the MVs within the given reference list is available, it then searches for the first available MV pointing to the target reference picture within the other reference list (designated as search scheme S5).

Figure 11:
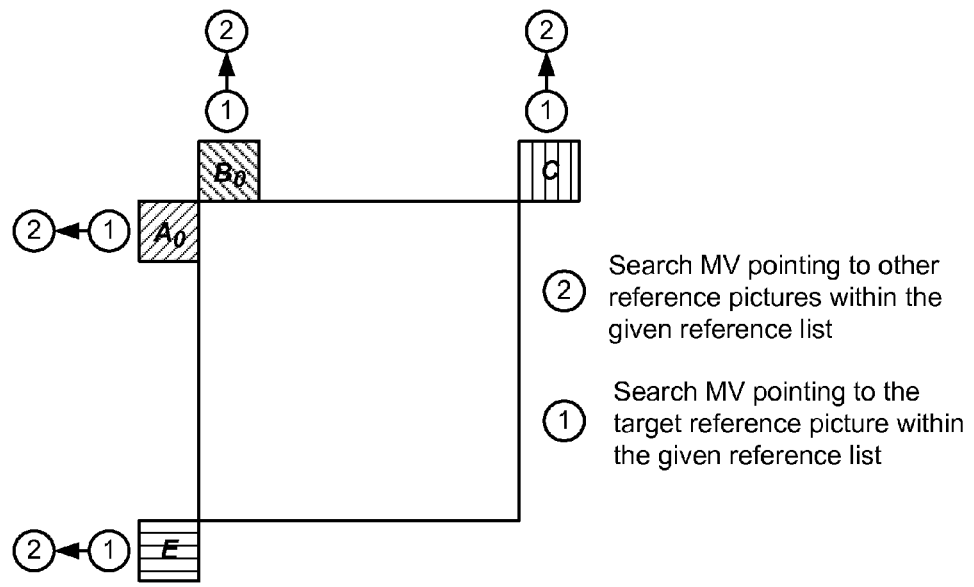
FIG. 11 illustrates an example of search scheme (S6) for a spatial MVP for Merge mode according to one embodiment of the present invention.

For the spatial MVP for Merge mode, when the target reference picture is given based on the given reference picture index and the given reference list, the MVP for Merge mode can also be derived from the reference pictures other than the target reference picture. FIG. 11 illustrates an example of the MVP selection for Merge mode, where the search scheme searches for the first available MV pointing to the target reference picture within the given reference list (marked as number 1). If none of the MVs within the given reference list is available, it then searches for the first available MV pointing to other reference pictures within the given reference list (designated as search scheme S6). When the selected MVP is an MV pointing to other reference pictures, the selected MVP will be properly scaled according to the temporal distances.

Figure 12:
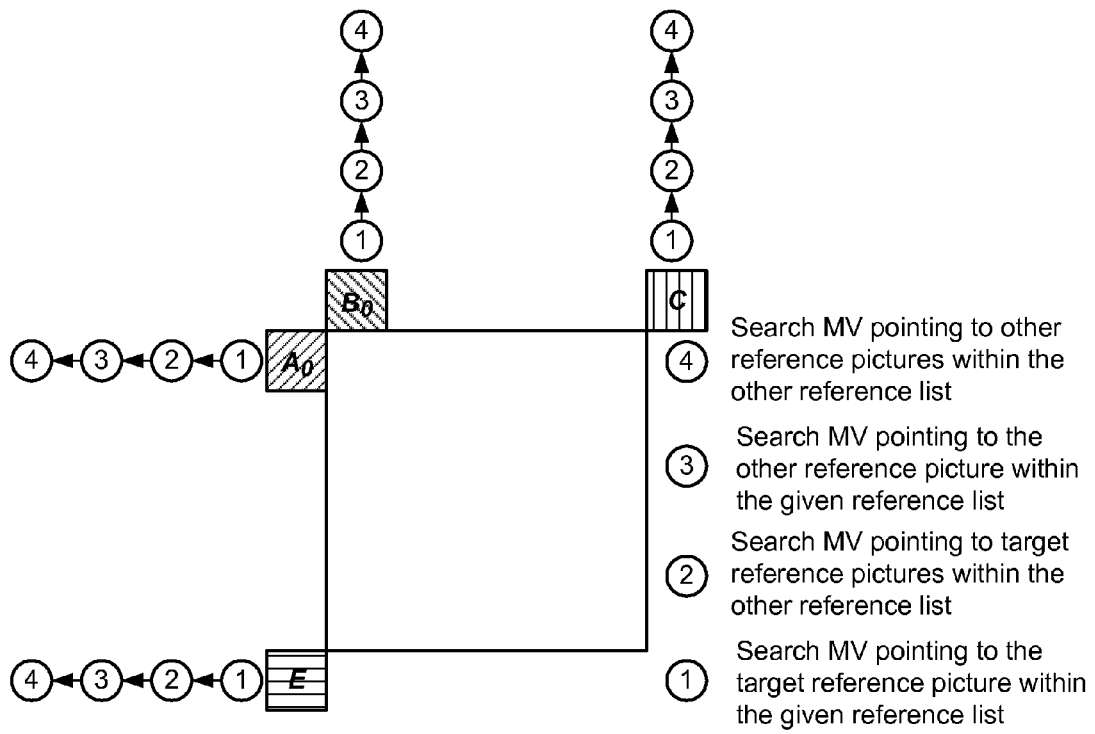
FIG. 12 illustrates an example of search scheme (S7) for a spatial MVP for Merge mode according to one embodiment of the present invention.

For the spatial MVP for Merge mode, when the target reference picture is given based on the given reference picture index and the given reference list, the spatial MVPs for Merge mode can be derived from the MVs pointing to the target reference picture within the given reference list or within the other reference list, or other reference pictures within the given reference list or within the other reference list based on a search order. FIG. 12 illustrates an example of the MVP selection for Merge mode, where the search scheme searches for the first available MV pointing to the target reference picture within the given reference list (marked as number 1). If none of the MVs is available, it then searches the MVs pointing to the target reference picture within the other reference list. If no MVP is found yet, it continues to search the MVs pointing to other reference pictures within the given reference list. If an MVP is still not found, it searches the MVs pointing to other reference pictures within the other reference list (designated as search scheme S7). When the selected MVP is among the MVs pointing to other reference pictures, the selected MVP will be properly scaled according to the temporal distances.

For the spatial MVP for Merge, the MVP can be derived as the selected MVP with a scaling factor. For the derivation of scaled MVP, the scaling factor may be based on the picture order count (POC) distance between a current picture and the reference picture indicated by the reference picture index of the selected neighboring block and the POC distance between current picture and the target reference picture indicated by the given reference picture index and the given reference list. The given reference picture index and the given reference list may be transmitted explicitly or implicitly.

In order to prevent the case that the POC in previous picture is lost, the POC of each entry for each reference list is transmitted in the slice header. A flag can be transmitted in the slice header to indicate whether the POC of each entry for each reference list in transmitted in the slice header. The POC of each entry for each reference list can also be transmitted using the reference picture list modification syntax.

Figure 13:
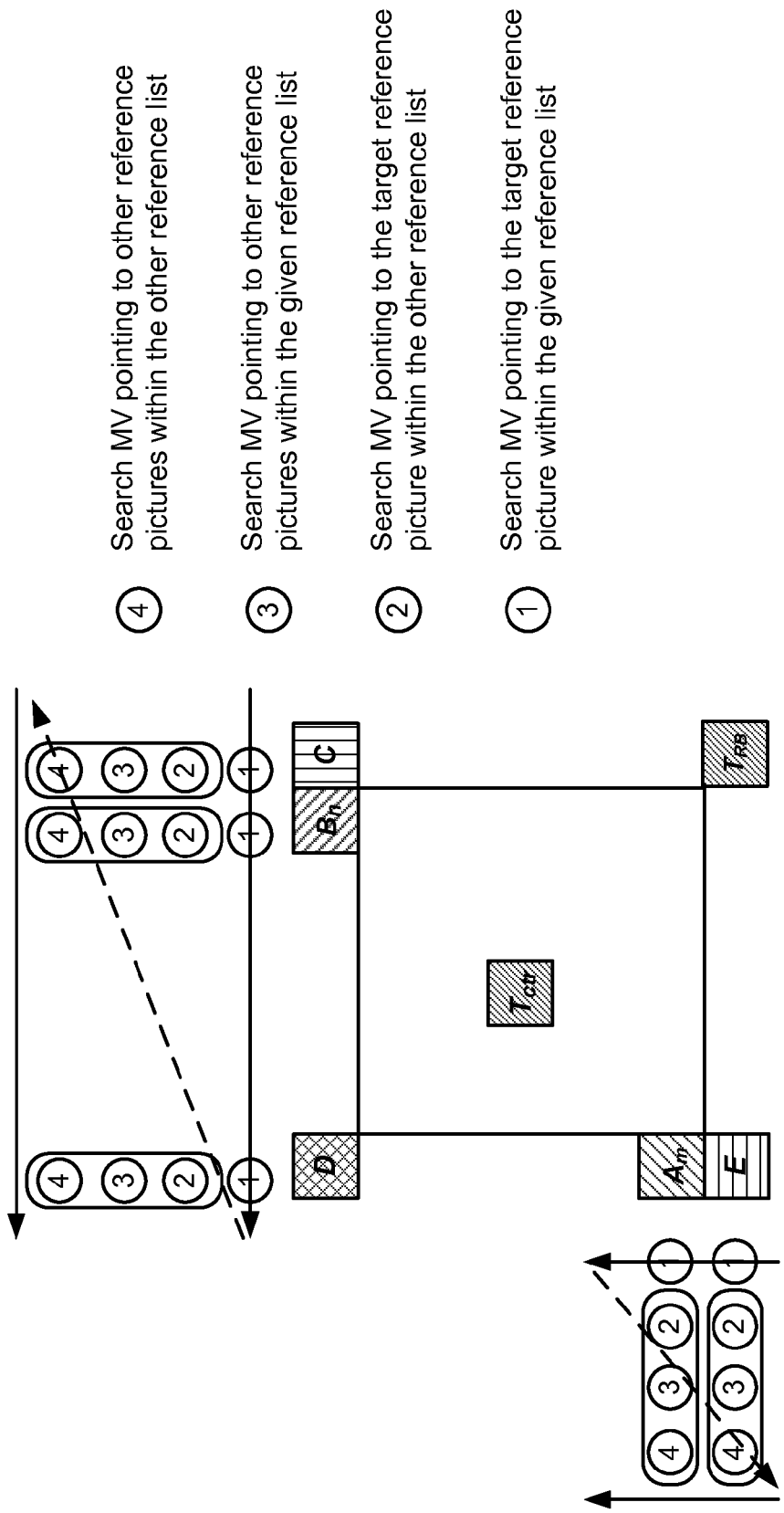
FIG. 13 illustrates an example of search scheme (S8) for a spatial MVP for Inter mode according to one embodiment of the present invention.

FIGS. 13-22 illustrate further examples of MVP derivation for Inter mode according to various embodiments of the present invention. The configuration of neighboring blocks for the spatial MVP derivation illustrated in FIGS. 13-22 contains a small number of blocks to reduce the computational complexity. Nevertheless, it is understood that the present invention is not limited to the particular neighboring block configuration and a skilled person in the field may practice the present invention by using other neighboring block configurations. FIG. 13 illustrates an example of the MVP selection for Inter mode, where the search scheme searches for the first available MV pointing to the target reference picture within the given reference list (marked as number 1). The search can be performed on the left predictors from bottom to top (i.e., from E to $A_n$) first and then the top predictors from right to left (i.e., from C, to $B_n$, and to D). Alternatively, the search can be performed on the top predictor first and then the left predictor. If none of the MVs pointing to the target reference picture within the given reference list is available, it then searches the local search sets. The searching through the local search sets can be performed in the same order as the search for first available MV pointing to the target reference picture within given reference list. Alternatively, the searching through the local search sets can be performed in a different order from the search for the first available MV pointing to the target reference picture within the given reference list. Each local search set consists of three MVs organized according to search priority order, where the first search MV corresponds to the MV pointing to the target reference picture within the other reference list (marked as number 2), the second search MV corresponds to the MV pointing to other reference pictures within the given reference list (marked as number 3), and the third search MV corresponds to the MV pointing to other reference pictures within the other reference list (marked as number 4). The search scheme shown in FIG. 13 is designated as search scheme S8. While the search scheme S8 uses three MVs in the local search set, a skilled person may practice the present invention by using a local search set with fewer than three MVs. For example, the search MV marked as number 4 may be removed from the local search set. When the selected MVP is from the MVs pointing to other reference pictures, the selected MVP will be properly scaled according to temporal distances.

Figure 14:
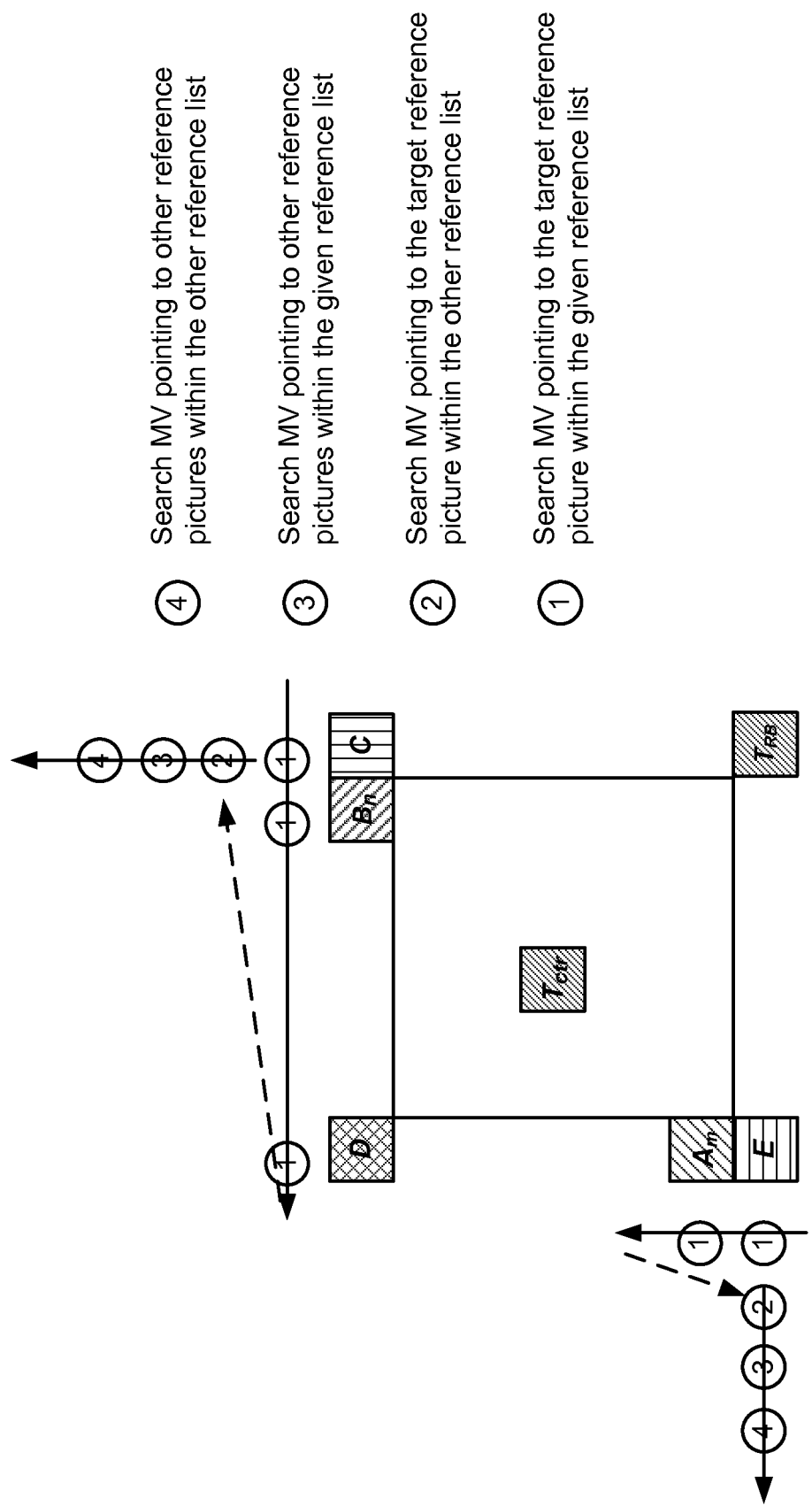
FIG. 14 illustrates an example of search scheme (S9) for a spatial MVP for Inter mode according to one embodiment of the present invention.

FIG. 14 illustrates an example of MVP selection for Inter mode similar to the example of FIG. 13. The search scheme searches for the first available MV pointing to the target reference picture within given reference list (marked as number 1). If none of the MVs pointing to the target reference picture within the given reference list is available, the search through the local search sets is only performed for blocks C and E. The search scheme shown in FIG. 14 is designated as search scheme S9. While search scheme S9 reduces the searching through the local search sets down to one neighboring block on the top and one neighboring block on the left, a skilled person the field may practice the present invention by reducing the local search set to more than one neighboring block on the top and/or more than one neighboring block on the left. When the selected MVP is from the MVs pointing to other reference pictures, the selected MVP will be properly scaled according to temporal distances.

Figure 15:
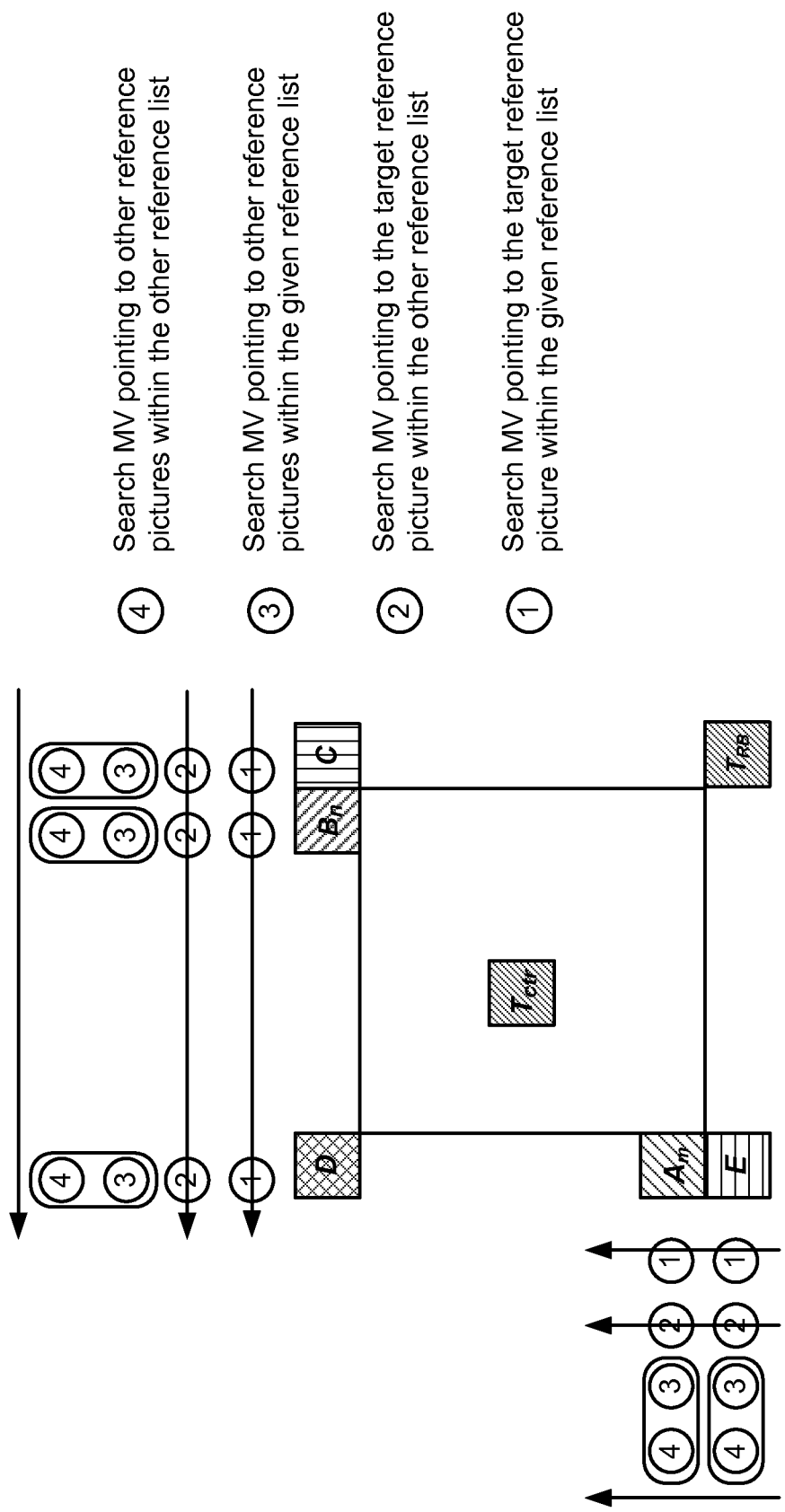
FIG. 15 illustrates an example of search scheme (S10) for a spatial MVP for Inter mode according to one embodiment of the present invention.

FIG. 15 illustrates another variation of MVP selection for Inter mode of FIG. 13. The search scheme searches for the first available MV pointing to the target reference picture within the given reference list (marked as number 1). If none of the MVs pointing to the target reference picture within the given reference list is available, it then searches for the first available MV among the MVs pointing to the target reference within the other reference list (marked as number 2). If none of the MVs marked as number 1 and number 2 is available, the searching through the local search sets is performed, wherein the local search set consists of two MVs organized according to search priority order, where the first searched MV corresponds to the MV pointing to other reference pictures within the given reference list (marked as number 3), and the second searched MV corresponds to the MV pointing to other reference pictures within the other reference list (marked as number 4). The search scheme shown in FIG. 15 is designated as search scheme S10. When the selected MVP is from the MVs pointing to other reference pictures, the selected MVP will be properly scaled according to temporal distances.

Figure 16:
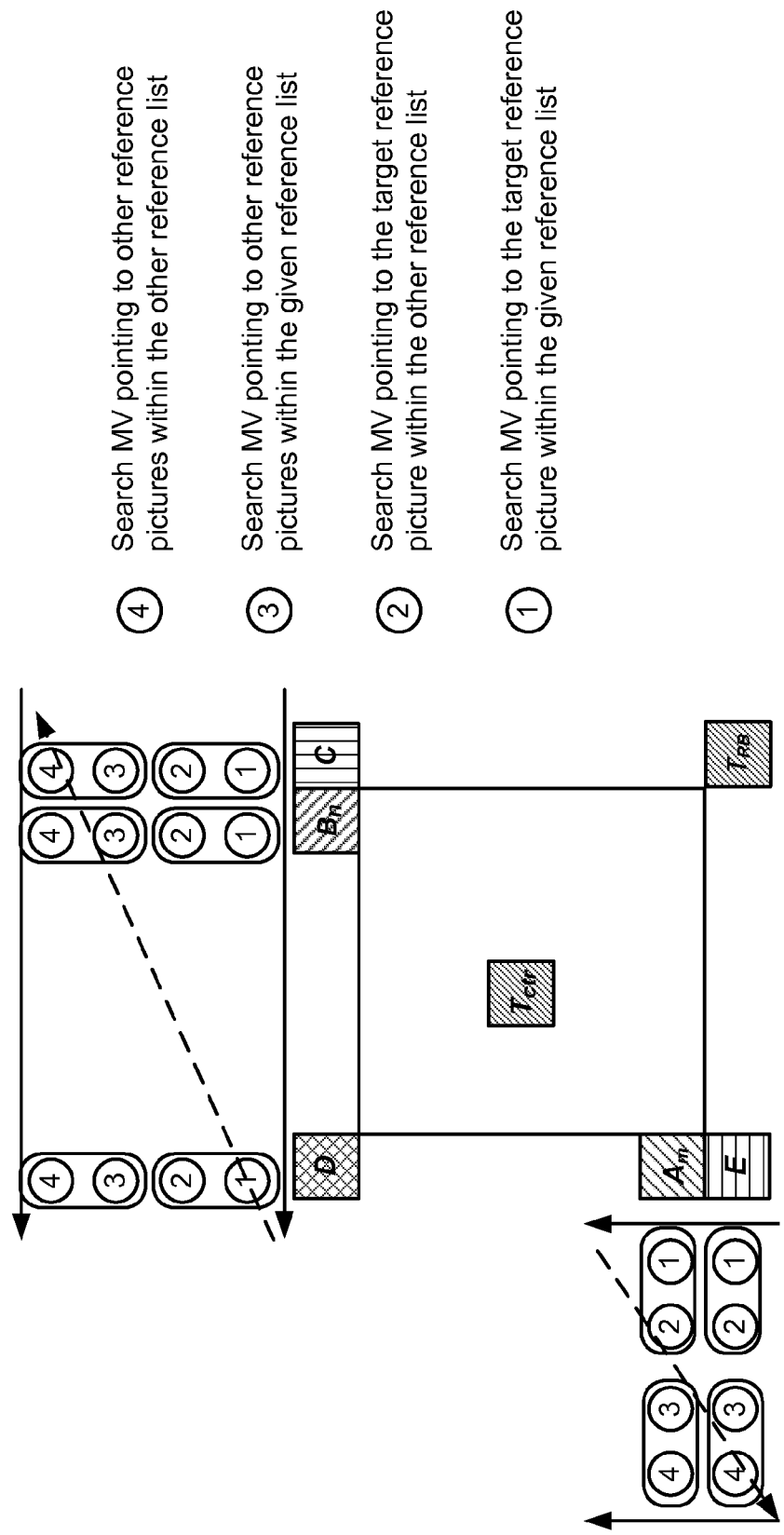
FIG. 16 illustrates an example of search scheme (S11) for a spatial MVP for Inter mode according to one embodiment of the present invention.

FIG. 16 illustrates yet another variation of MVP selection for Inter mode where two local search sets are formed. The search scheme searches the first local search sets and then the second local search sets. The search is performed on the top blocks from right to left and on the left blocks from bottom to top. The first local search set consists of two MVs organized according to search priority order, where the first searched MV corresponds to the MV pointing to the target reference picture within the given reference list (marked as number 1), and the second searched MV corresponds to the MV pointing to the target reference picture within the other reference list (marked as number 2). The second local search set consists of two MVs organized according to search priority order, where the first searched MV corresponds to the MV pointing to other reference pictures within the given reference list (marked as number 3), and the second searched MV corresponds to the MV pointing to other reference pictures within the other reference list (marked as number 4). The search scheme shown in FIG. 16 is designated as search scheme S11. When the selected MVP is from the MVs pointing to other reference pictures, the selected MVP will be properly scaled according to temporal distances.

Figure 17:
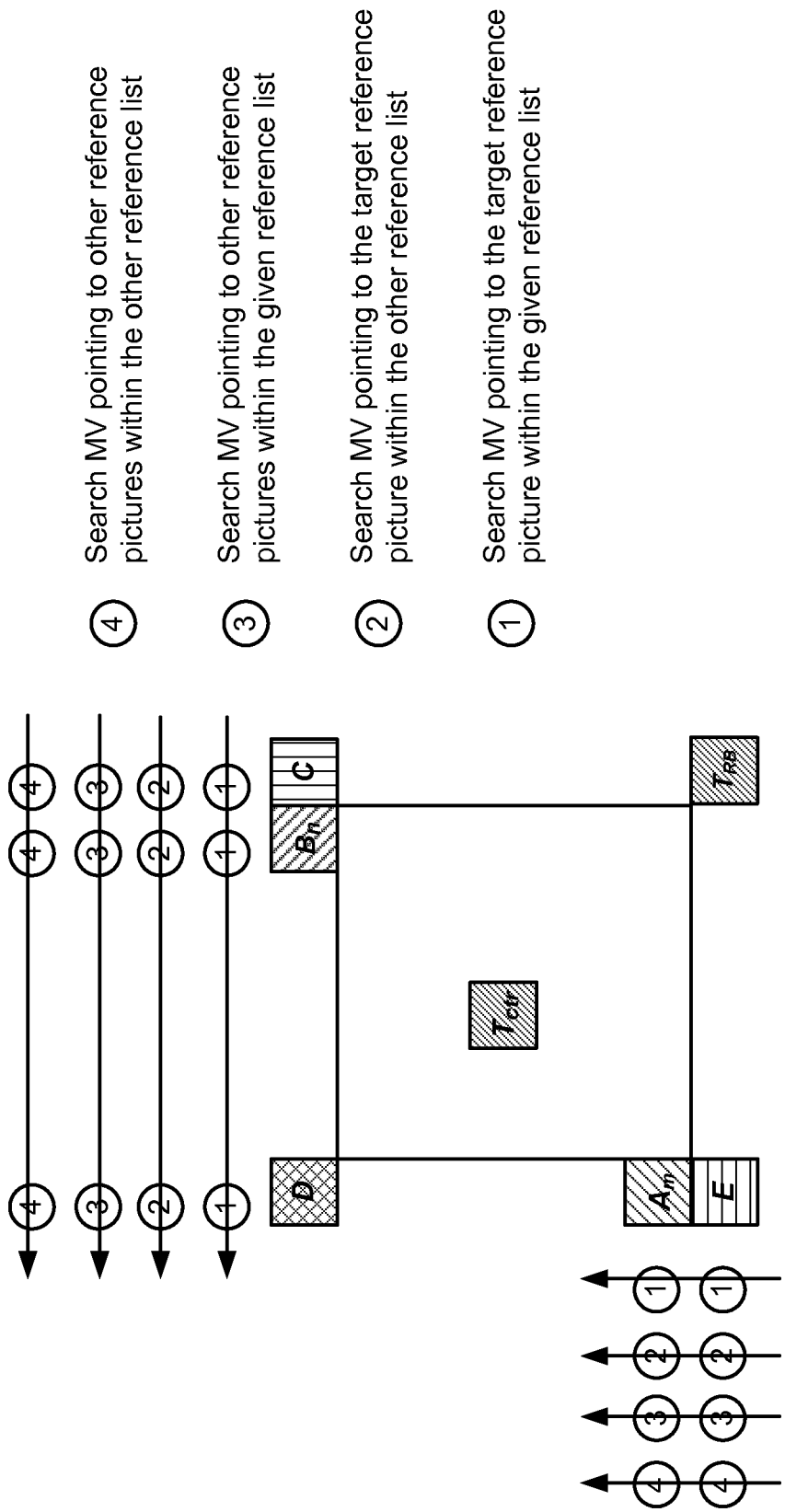
FIG. 17 illustrates an example of search scheme (S12) for a spatial MVP for Inter mode according to one embodiment of the present invention.

FIG. 17 illustrates an example of MVP selection for Inter mode, where the search order for the MV is 1) the MVs pointing to the target reference picture within the given reference list (marked as number 1), 2) the MVs pointing to the target reference picture within the other reference list (marked as number 2), 3) the MVs pointing to other reference pictures within the given reference list (marked as number 3), and 4) the MVs pointing to other reference pictures within the other reference list (marked as number 4). The search is performed on the blocks on the top side from right to left, and the blocks on the left side from bottom to top as shown in FIG. 17. The search scheme shown in FIG. 17 is designated as search scheme S12. When the selected MVP is from the MVs pointing to other reference pictures, the selected MVP will be properly scaled according to temporal distances.

Figure 18:
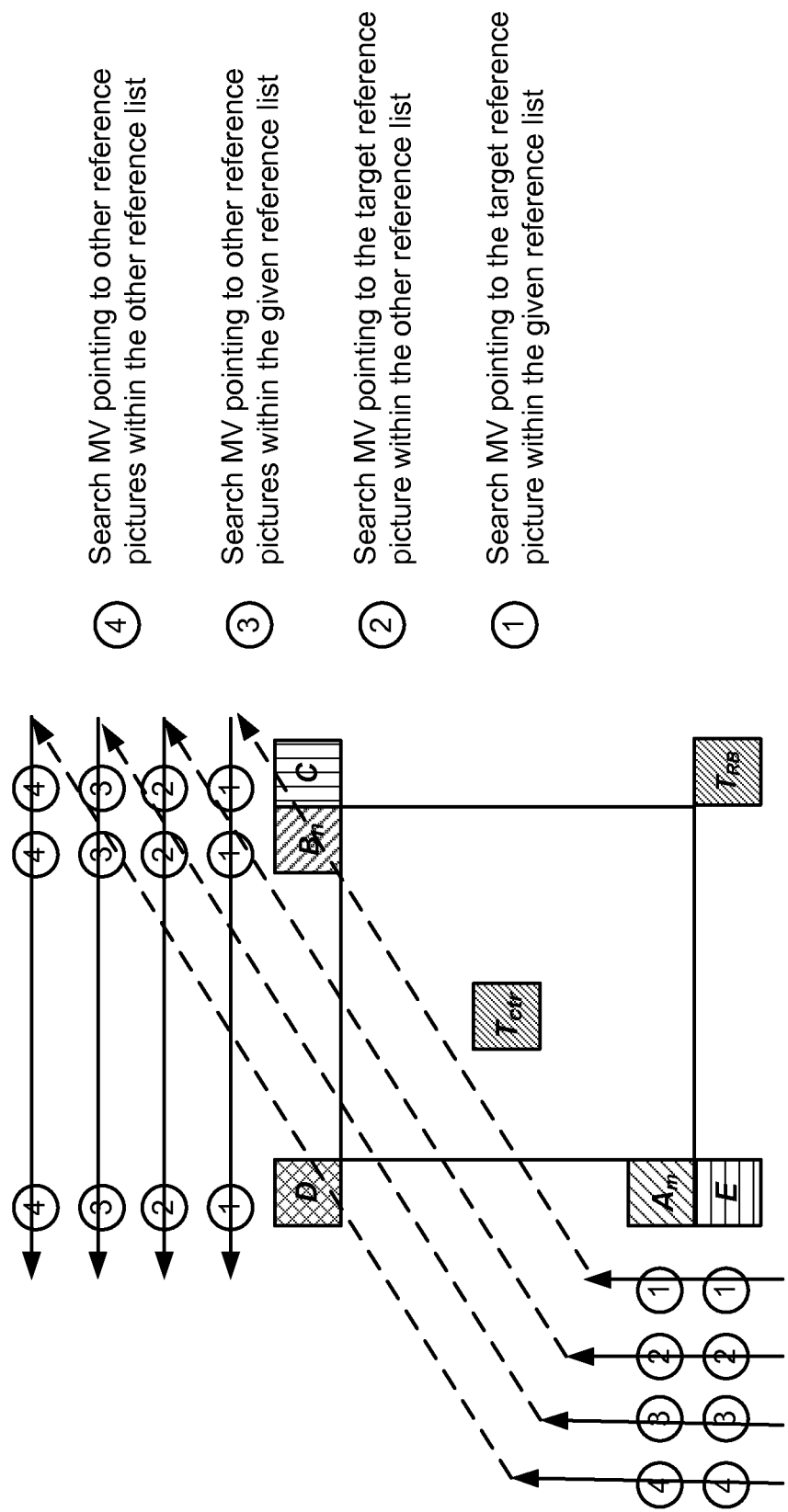
FIG. 18 illustrates an example of search scheme (S13) for a spatial MVP for Inter mode according to one embodiment of the present invention.

FIG. 18 illustrates an example of MVP selection for Inter mode similar to that of FIG. 17. However, the search scheme in FIG. 18 uses an interleaved search pattern between the first group of neighboring blocks (blocks on the left) and the second group of neighboring blocks (blocks on the top) to find a first MVP based on the first group of neighboring blocks and a second MVP based on the second group of neighboring blocks. The search is first performed for MVs marked as number 1 from bottom to top (the first group) and then from right to left (the second group). When a first MVP is found, the second MVP (can be left or top MVP) is performed to search a MVP which not identical to the first MVP. If none of the MVs pointing to the target reference picture within the given reference list is available and effective for the left MVP, the search is then performed for MVs marked as number 2 from bottom to top (the first group). An effective MVP refers to an MVP that is not identical to previous MVPs in this disclosure. If none of the MVs pointing to the target reference picture within the given reference list is available and effective for the top MVP, the search is then performed for MVs marked as number 2 from right to left (the second group). If the MVP of the first group is not found, the search is then performed for MVs marked as number 3 from bottom to top (the first group); and if the MVP of the second group is not found, the search is then from right to left (the second group). If the MVP of the first group is still not found, the search is then performed for MVs marked as number 4 from bottom to top (the first group); and if the MVP of the second group is still not found, the search is then performed from right to left (the first group). In the search process, if an MVP is found for a group of blocks, the remaining search is not performed for the group of blocks. Instead, the search is only continued for the other group to select a respective MVP for the other group. The search scheme shown in FIG. 18 is designated as search scheme S13. When the selected MVP is from the MVs pointing to other reference pictures, the selected MVP will be properly scaled according to temporal distances.

The algorithms in FIG. 18 through FIG. 21 use an interleaved search pattern between the first group of neighboring blocks (blocks on the left) and the second group of neighboring blocks (blocks on the top) to find a first MVP based on the first group of neighboring blocks and a second MVP based on the second group of neighboring blocks. In the search process, if an MVP is found for one group of blocks, the remaining search is not performed for the group of blocks. Instead, the search is only continued for the other group to select a respective MVP.

Figure 19:
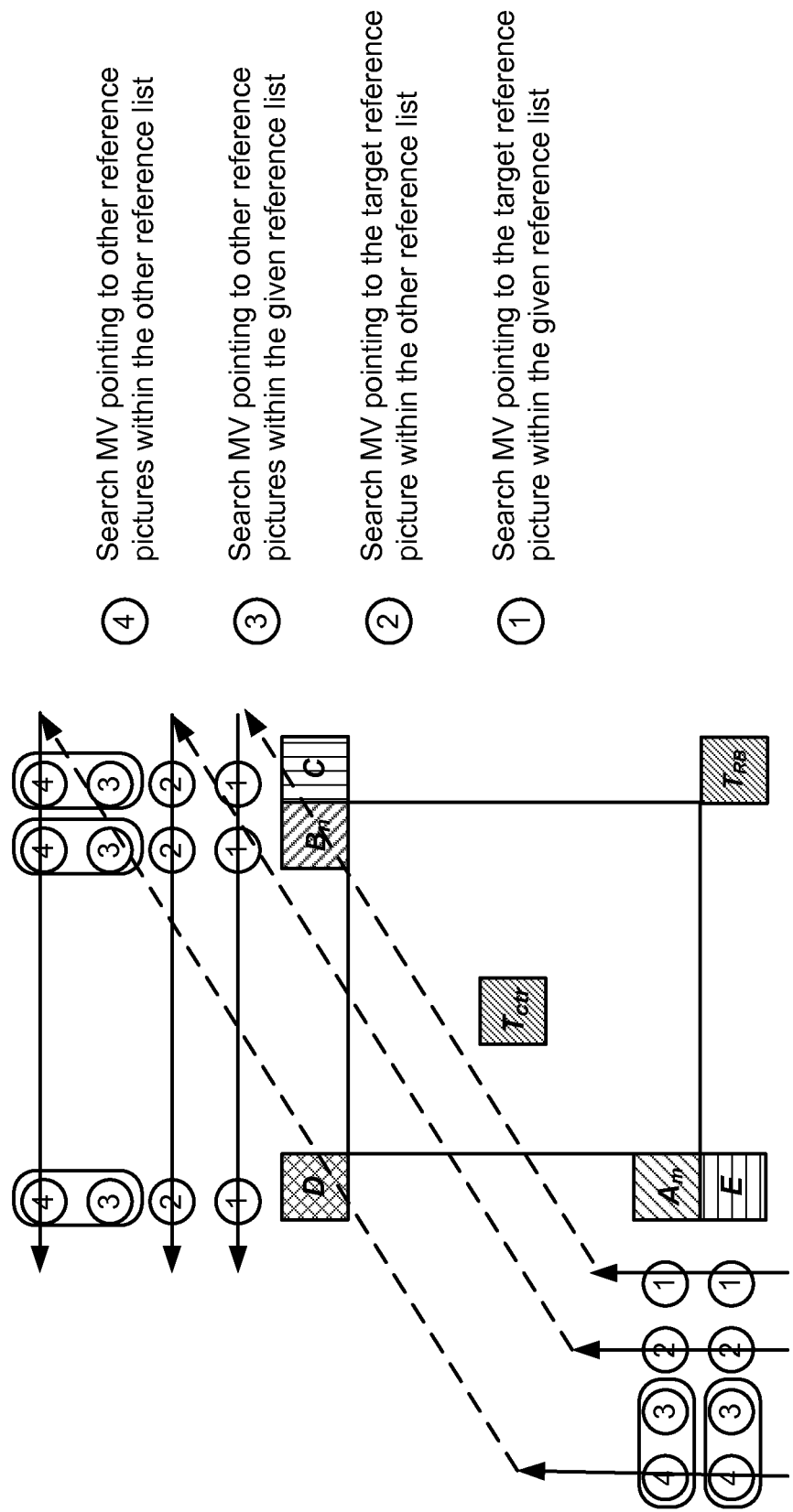
FIG. 19 illustrates an example of search scheme (S14) for a spatial MVP for Inter mode according to one embodiment of the present invention.

FIG. 19 illustrates an example of MVP selection for Inter mode similar to that of FIG. 15. For the search scheme S10 in FIG. 15, the search scheme first searches for the MVP based on the left side or the top side. After the first MVP is derived on the first side, it searches the second effective MVP which is not identical to the first MVP on other side. An embodiment according to the present invention searches the left side and the top side according to an interleaved pattern. The search is first performed for the MVs marked as number 1 from bottom to top for the left MVP and then from right to left for the top MVP. When a first MVP is found, the second MVP (can be left or top MVP) is performed to search a MVP which not identical to the first MVP. If none of the MVs pointing to the target reference picture within the given reference list is available and effective (not identical to previous selected MVPs) from bottom to top, the search is then performed for MVs marked as number 2 from bottom to top for the left MVP. If none of the MVs pointing to the target reference picture within the given reference list is available and effective from right to left, the search is then performed for MVs marked as number 2 from right to left for the top MVP. If the left or top MVP is still not found, the search is then performed for the local search sets from bottom to top for the left MVP or from right to left for the top MVP, wherein the local search set consists of two MVs organized according to search priority order, where the first searched MV corresponds to the MV pointing to other reference pictures within the given reference list (marked as number 3), and the second searched MV corresponds to the MV pointing to other reference pictures within the other reference list (marked as number 4). The search scheme shown in FIG. 19 is designated as search scheme S14. When the selected MVP is from the MVs pointing to other reference pictures, the selected MVP will be properly scaled according to temporal distances.

Figure 20:
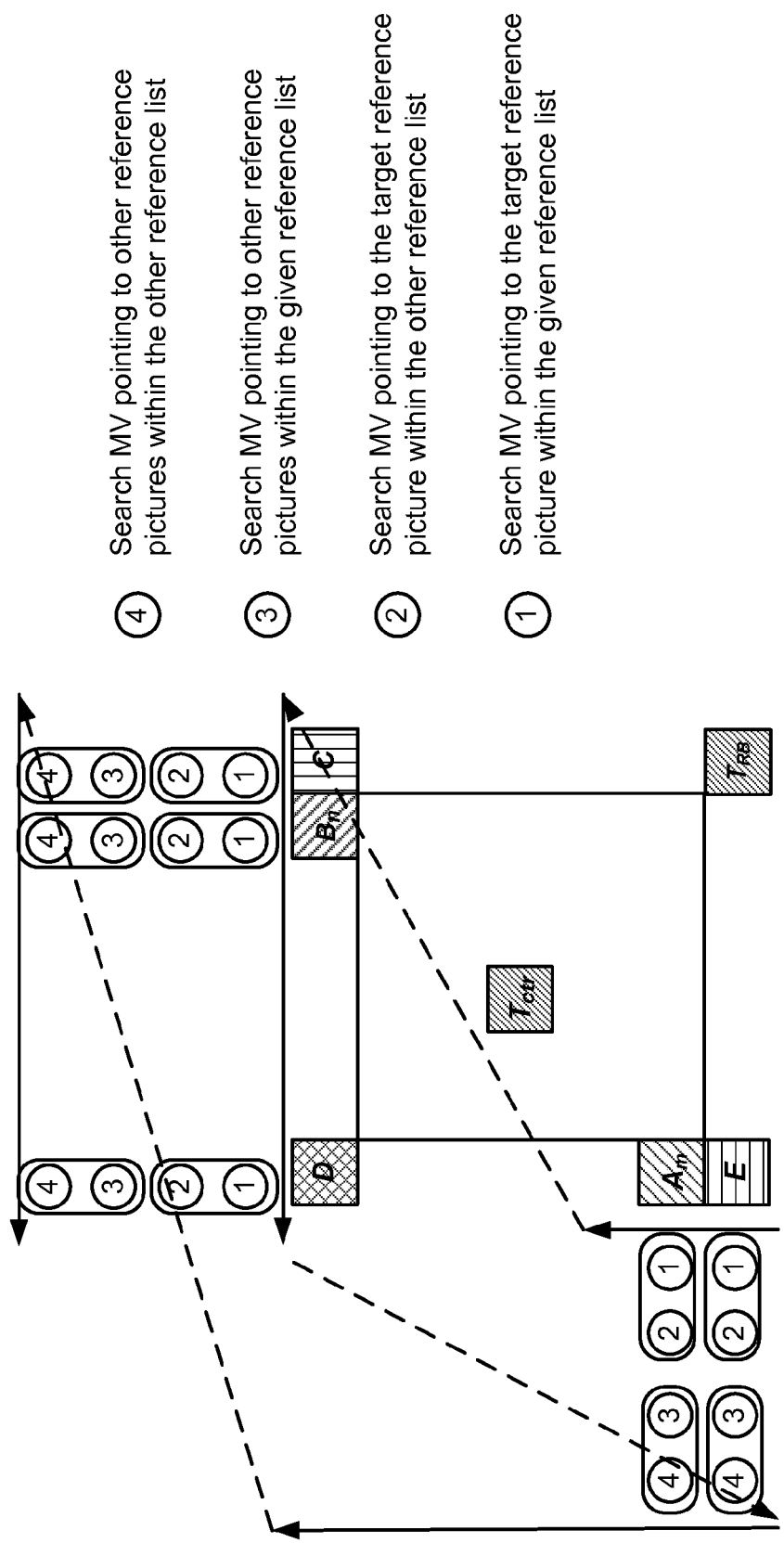
FIG. 20 illustrates an example of search scheme (S15) for a spatial MVP for Inter mode according to one embodiment of the present invention.

FIG. 20 illustrates an example of MVP selection for Inter mode similar to that of FIG. 16. However, an embodiment of the present invention as shown in FIG. 20 searches the first local search sets and the second local search sets in an interleaved pattern. The search is performed for the first local search sets from bottom to top and then from right to left. If no MVP of left MVP or top MVP is found, the search is performed for the second local search sets from bottom to top (for the left MVP) or from right to left (for the top MVP), respectively. When a first MVP is found, the second MVP (can be left or top MVP) is performed to search a MVP which not identical to the first MVP. The first local search set consists of two MVs organized according to search priority order, where the first searched MV corresponds to the MV pointing to the target reference picture within the given reference list (marked as number 1), and the second searched MV corresponds to the MV pointing to the target reference picture within the other reference list (marked as number 2). The second local search set consists of two MVs organized according to search priority order, where the first searched MV corresponds to the MV pointing to other reference pictures within the given reference list (marked as number 3), and the second searched MV corresponds to the MVs pointing to other reference pictures within the other reference list (marked as number 4). The search scheme shown in FIG. 20 is designated as search scheme S15. When the selected MVP is from the MVs pointing to other reference pictures, the selected MVP will be properly scaled according to temporal distances.

Figure 21:
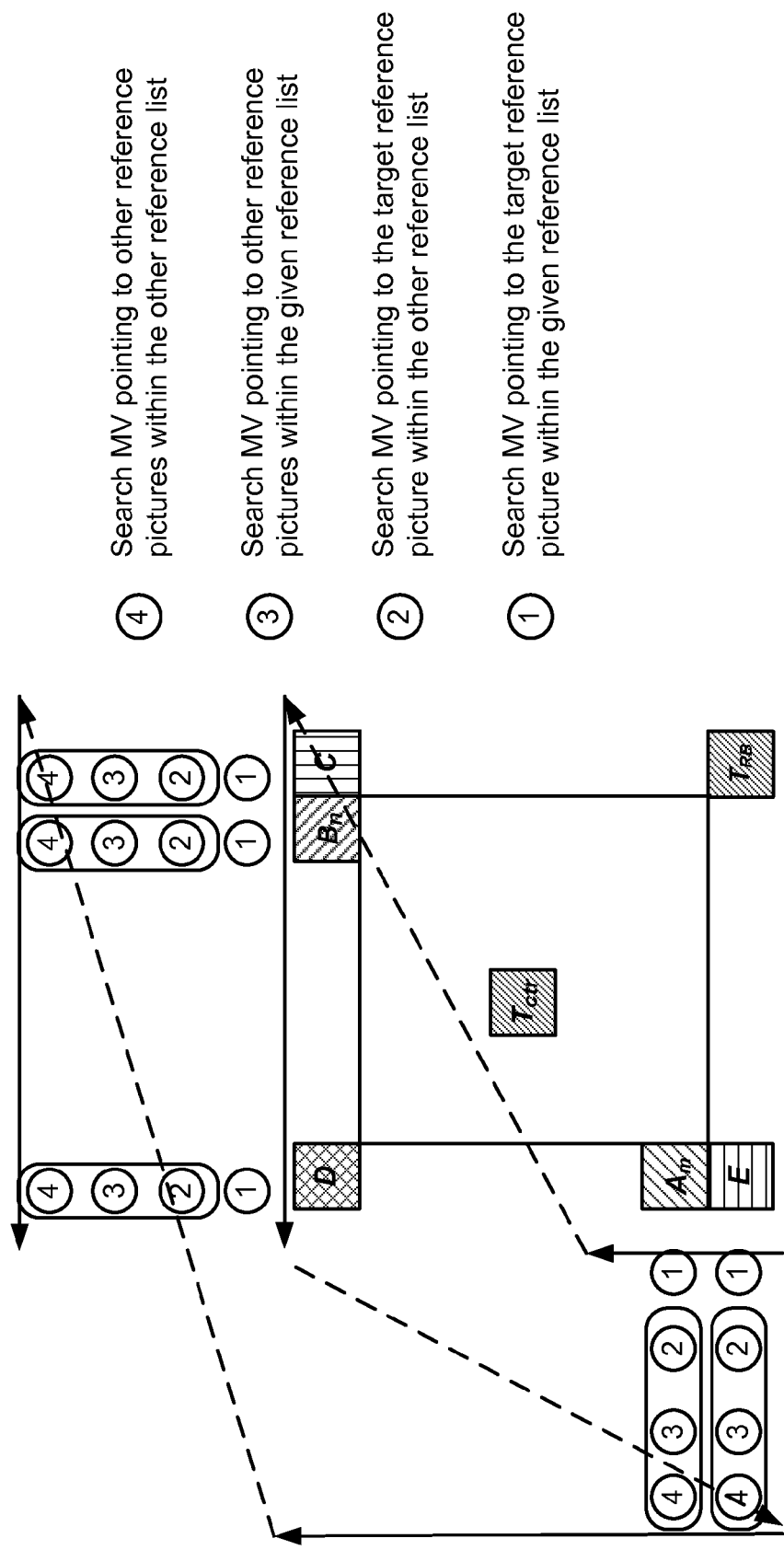
FIG. 21 illustrates an example of search scheme (S16) for a spatial MVP for Inter mode according to one embodiment of the present invention.

FIG. 21 illustrates an example of MVP selection for Inter mode similar to that of FIG. 13. For the search scheme S8 in FIG. 13, it searches for the first available MV pointing to the target reference picture within given reference list (marked as number 1) from bottom to top and then from right to left. When a first MVP is found, the second MVP (can be left or top MVP) is performed to search a MVP which not identical to the first MVP. If none of the MVs pointing to the target reference picture within the given reference list is available from bottom to top or from right to left, it then searches the local search sets from bottom to top or from right to left, respectively. Each local search set consists of three MVs organized according to search priority order, where the first searched MV corresponds to the MV pointing to the target reference picture within the other reference list (marked as number 2), the second searched MV corresponds to the MV pointing to other reference pictures within the given reference list (marked as number 3), and the third searched MV corresponds to the MV pointing to other reference pictures within the other reference list (marked as number 4). The search scheme shown in FIG. 21 is designated as search scheme S16. When the selected MVP is from the MVs pointing to other reference pictures, the selected MVP will be properly scaled according to temporal distances.

In this disclosure, exemplary configurations of spatial neighboring blocks have been provided to illustrate embodiments according to the present invention. While separate exemplary configurations have been provided for the Inter/Skip mode and Merge mode, the exemplary configuration for the Inter/Skip mode is applicable to Merge mode, and vice versa. Furthermore, separate exemplary search schemes have been provided for the Inter/Skip mode and Merge mode. However, the search scheme for the Inter/Skip mode is applicable to Merge mode, and vice versa.

Embodiment of MVP derivation according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of deriving a motion vector predictor (MVP) for a motion vector (MV) of a current block in Inter, or Merge, or Skip mode, wherein the MV is associated with the current block and a corresponding block of a target reference picture in a given reference list, the method comprising:

receiving motion vectors (MVs) associated with neighboring blocks of the current block;

determining first MV attribute search comprising whether a given MV pointing to the target reference picture in the given reference list, or whether the given MV pointing to the target reference picture in other reference list, and determining second MV attribute search comprising whether the given MV pointing to other reference pictures in the given reference list, or whether the given MV pointing to the other reference pictures in the other reference list;

determining the MVP for the current block from the neighboring blocks according to a search order, wherein first effective MV is selected as the MVP, and wherein the search order comprises searching the MVs for the first effective MV having asserted first MV attribute search firstly; and searching the MVs for the first effective MV having asserted second MV attribute search firstly when no MV has the asserted first MV attribute search; and providing the MVP for the current block.

2. The method of claim 1, wherein the neighboring blocks comprise blocks on top side, upper-left corner and upper-right corner of the current block in the Inter or Skip mode, and wherein the search order for the blocks is from right to left.

3. The method of claim 1, wherein the neighboring blocks comprise blocks on left side and lower-left corner of the current block in the Inter or Merge or Skip mode, and wherein the search order for the blocks is from bottom to top.

4. The method of claim 1, wherein the neighboring blocks comprise a leftmost block on top side and an upper-right corner block of the current block in the Inter or Merge or Skip mode, and wherein the search order for the blocks is from the upper-right corner block to the leftmost block on the top side.

5. The method of claim 1, wherein the neighboring blocks comprise a top block on left side and a lower-left corner block of the current block in the Inter or Merge or Skip mode, and wherein the search order for the blocks is from the lower-left corner block to the top block on the left side.

6. The method of claim 1, wherein the MVP is scaled before the MVP is provided if the MVP is associated with a MV pointing to the other reference pictures in the given reference list or the other reference list.

7. The method of claim 6, wherein the MVP is scaled according to picture-order-count (POC) distance associated with the MVP and the POC distance between a current picture and the target reference picture.

8. The method of claim 1, wherein the first MV attribute search associated with each of the neighboring blocks contains two first MV attribute search elements, said two first MV attribute search elements are configured as a local search set having a local search order, wherein the search order comprises searching from one local search set for a neighboring block to next local search set for another neighboring block.

9. The method of claim 1, wherein the second MV attribute search associated with each of the neighboring blocks contains two second MV attribute search elements, said two second MV attribute search elements are configured as a local search set having a local search order, wherein the search order comprises searching from one local search set for a neighboring block to next local search set for another neighboring block.

10. The method of claim 1, wherein a picture index for the target reference picture is implicitly derived.

11. The method of claim 10, wherein the picture index for the target reference picture is derived according to median or mean of neighboring reference picture indices associated with the neighboring blocks or majority of the neighboring reference picture indices.

12. The method of claim 1, wherein a picture index is explicitly signaled for the current block in the Merge mode, Skip mode, or Inter mode.

13. The method of claim 1, wherein the MVP is related to uni-prediction or bi-prediction according to explicit signaling or implicit inferring for the current block in the Merge mode, Skip mode, or Inter mode.

14. An apparatus of deriving a motion vector predictor (MVP) for a motion vector (MV) of a current block in Inter, or Merge, or Skip mode, wherein the MV is associated with the current block and a corresponding block of a target reference picture in a given reference list, the apparatus comprising one or more electronic circuits configured to:

receive motion vectors (MVs) associated with neighboring blocks of the current block;

determine first MV attribute search comprising whether a given MV pointing to the target reference picture in the given reference list, or whether the given MV pointing to the target reference picture in other reference list, and determining second MV attribute search comprising whether the given MV pointing to other reference pictures in the given reference list, or whether the given MV pointing to the other reference pictures in the other reference list;

determine the MVP for the current block from the neighboring blocks according to a search order, wherein first effective MV is selected as the MVP, and wherein the search order comprises searching the MVs for the first effective MV having asserted first MV attribute search firstly; and searching the MVs for the first effective MV having asserted second MV attribute search firstly when no MV has the asserted first MV attribute search; and provide the MVP for the current block.

15. The apparatus of claim 14, wherein the neighboring blocks comprise blocks on top side, upper-left corner and upper-right corner of the current block in the Inter or Merge or Skip mode, and wherein the search order for the blocks are from right to left.

16. The apparatus of claim 14, wherein the neighboring blocks comprise blocks on left side and lower-left corner of the current block in the Inter or Merge or Skip mode, and wherein the search order for the blocks is from bottom to top.

17. The apparatus of claim 14, wherein the neighboring blocks comprise a leftmost block on top side and an upper-right corner block of the current block in the Inter or Merge or Skip mode, and wherein the search order for the blocks is from the upper-right corner block to the leftmost block on the top side.

18. The apparatus of claim 14, wherein the neighboring blocks comprise a top block on left side and a lower-left corner block of the current block in the Inter or Merge or Skip mode, and wherein the search order for the blocks is from the lower-left corner block to the top block on the left side.

19. The apparatus of claim 14, wherein the MVP is scaled before the MVP is provided if the MVP is associated with a MV pointing to the other reference pictures in the given reference list or the other reference list.

20. The apparatus of claim 14, wherein the first MV attribute search associated with each of the neighboring blocks contains two first MV attribute search elements, said two first MV attribute search elements are configured as a local search set having a local search order, wherein the search order comprises searching from one local search set for a neighboring block to next local search set for another neighboring block.

21. The apparatus of claim 14, wherein the second MV attribute search associated with each of the neighboring blocks contains two second MV attribute search elements, said two second MV attribute search elements are configured as a local search set having a local search order, wherein the search order comprises searching from one local search set for a neighboring block to next local search set for another neighboring block.

\* \* \* \* \*